(12) United States Patent
Schwarzkopf et al.

(10) Patent No.: US 9,708,002 B2
(45) Date of Patent: Jul. 18, 2017

(54) DRIVER ASSISTANCE SYSTEM INCLUDING ADDITIONAL INFORMATION IN CONNECTION WITH A ROAD MAP

(71) Applicant: Robert Bosch GmbH, Stuttgart (DE)

(72) Inventors: Jeannine Schwarzkopf, Ludwigsburg (DE); Armin Ruehle, Weinstadt (DE); Carsten Hasberg, Ilsfeld-Auenstein (DE); Karsten Muehlmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/893,757

(22) PCT Filed: Mar. 27, 2014

(86) PCT No.: PCT/EP2014/056120
§ 371 (c)(1),
(2) Date: Nov. 24, 2015

(87) PCT Pub. No.: WO2014/187594
PCT Pub. Date: Nov. 27, 2014

(65) Prior Publication Data
US 2016/0107688 A1    Apr. 21, 2016

(30) Foreign Application Priority Data
May 24, 2013   (DE) .................. 10 2013 209 729

(51) Int. Cl.
*B62D 15/02*   (2006.01)
*G01C 21/34*   (2006.01)
(Continued)

(52) U.S. Cl.
CPC .......... *B62D 15/025* (2013.01); *G01C 21/32* (2013.01); *G01C 21/34* (2013.01); *G06F 17/30241* (2013.01); *G09B 29/007* (2013.01)

(58) Field of Classification Search
CPC ...... B62D 15/025; G01C 21/32; G01C 21/34; G06F 17/30241; G09B 29/007
See application file for complete search history.

(56) References Cited

U.S. PATENT DOCUMENTS 6,836,719 B2 * 12/2004 Andersson ......... B60K 31/0058
                                                                123/352
9,114,727 B2 *  8/2015 Choi .................... B60L 15/2045
(Continued)

FOREIGN PATENT DOCUMENTS

DE          19916967       11/2000
DE         102008012661     2/2009
(Continued)

OTHER PUBLICATIONS

International Search Report for PCT/EP2014/056120 issued on Jul. 4, 2014.

*Primary Examiner* — Tuan C. To
(74) *Attorney, Agent, or Firm* — Norton Rose Fulbright US LLP; Gerard Messina

(57) ABSTRACT

A driver assistance system and a method for storing additional information for a road map for a driver assistance system are provided, the supplementary information concerning location- and/or time-specific compliance with traffic rules being stored. The supplementary information is taken into account by the driver assistance system.

8 Claims, 1 Drawing Sheet

(51) Int. Cl.
  *G06F 17/30* (2006.01)
  *G09B 29/00* (2006.01)
  *G01C 21/32* (2006.01)

(56) References Cited

U.S. PATENT DOCUMENTS

| | | | | |
|---|---|---|---|---|
| 2010/0042315 | A1* | 2/2010 | Ikeuchi | G01C 21/32 701/532 |
| 2010/0253492 | A1* | 10/2010 | Seder | G01S 13/723 340/435 |
| 2011/0087390 | A1* | 4/2011 | Pandit | B60K 1/00 701/22 |
| 2011/0130956 | A1* | 6/2011 | Tracton | G01C 21/3644 701/533 |
| 2012/0072097 | A1* | 3/2012 | Ohta | B60R 1/00 701/118 |
| 2012/0083959 | A1* | 4/2012 | Dolgov | G05D 1/0055 701/23 |
| 2013/0013314 | A1* | 1/2013 | Boschker | G10L 13/00 704/260 |
| 2013/0054133 | A1* | 2/2013 | Lewis | G01C 21/3407 701/423 |
| 2013/0066611 | A1* | 3/2013 | Yamada | B60W 50/0098 703/6 |
| 2013/0158800 | A1* | 6/2013 | Trageser | G08G 1/167 701/41 |
| 2013/0332057 | A1* | 12/2013 | Moore | G08G 1/0962 701/118 |
| 2013/0338852 | A1* | 12/2013 | Otake | B60T 7/12 701/1 |
| 2014/0129130 | A1* | 5/2014 | Kuramura | G01C 21/00 701/400 |
| 2015/0046038 | A1* | 2/2015 | Kawamata | B60W 30/09 701/41 |
| 2015/0066241 | A1* | 3/2015 | Akiyama | B60W 10/18 701/1 |
| 2015/0253142 | A1* | 9/2015 | Kornhauser | G01C 21/3415 701/522 |
| 2015/0298621 | A1* | 10/2015 | Katoh | B60R 11/04 348/148 |
| 2016/0075330 | A1* | 3/2016 | Oguri | B60T 7/18 701/70 |

FOREIGN PATENT DOCUMENTS

| | | |
|---|---|---|
| DE | 102008012654 | 3/2009 |
| JP | H06117869 A | 4/1994 |
| JP | 2010097345 A | 4/2010 |

* cited by examiner

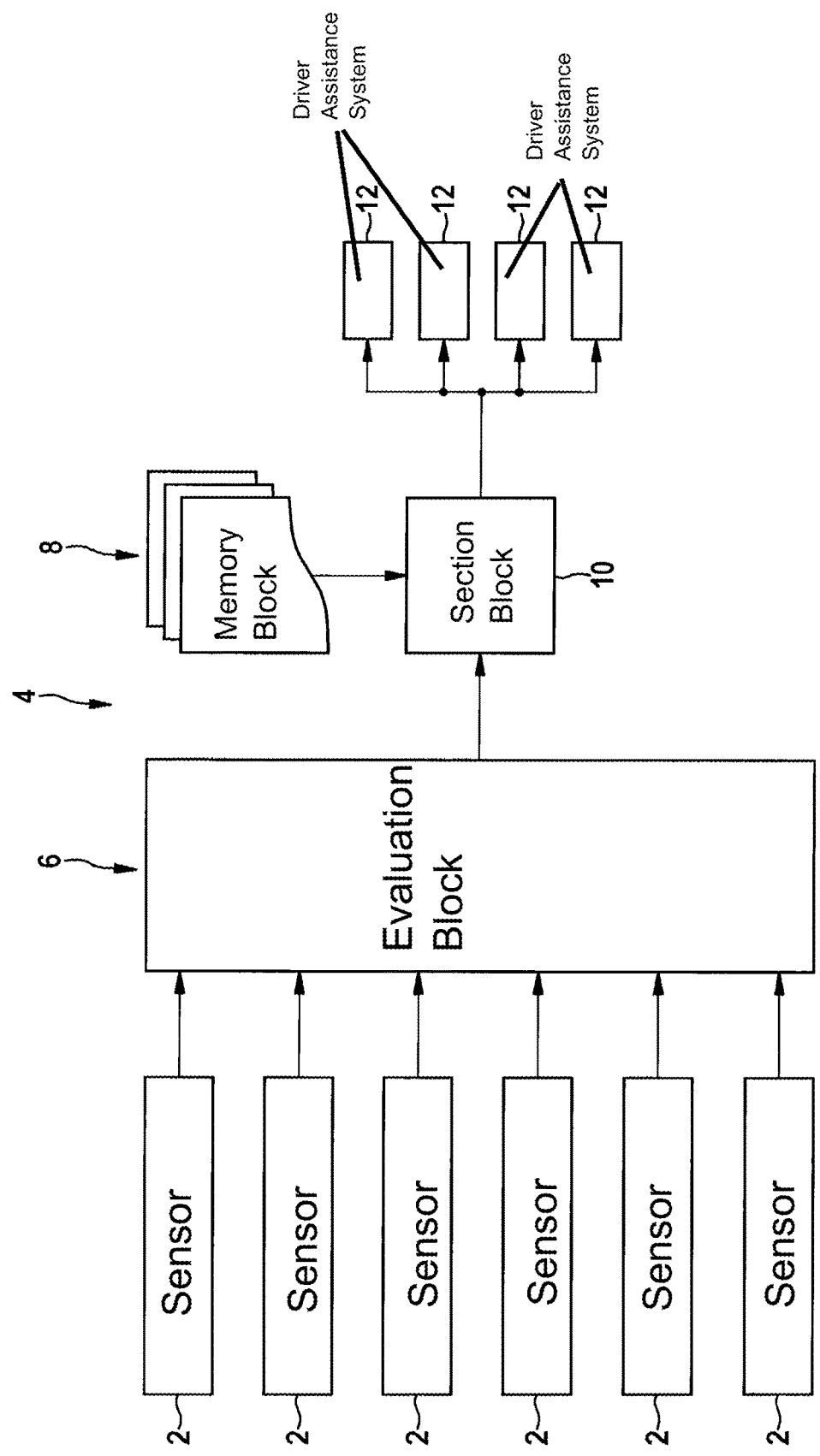

DRIVER ASSISTANCE SYSTEM INCLUDING ADDITIONAL INFORMATION IN CONNECTION WITH A ROAD MAP

FIELD OF THE INVENTION

The present invention is based on a driver assistance system, a method for assisting a driver, a method for storing additional information in a road map for a driver assistance system, a system, and on a data memory.

BACKGROUND INFORMATION

Automated driving or driver assistance functionalities or also autonomous vehicles frequently depend on a map of the road network. In addition, they need to be familiar with the traffic rules of the particular country in which the vehicle is currently located.

Furthermore, the use of a so-called environment sensor system makes it possible to obtain additional information from the vehicle environment, such as the current and upcoming road course, the state of the road surface, but also information about further road users in the immediate vicinity. This makes it possible, for example, to carry out a parameterization for the driver assistance system, which considers a change in the danger situation.

SUMMARY

It is an object of the present invention to improve a driver assistance system.

An improvement in the driver assistance systems which intervene in the drive and control or signaling devices of the vehicle either in a partially autonomous or an autonomous manner, or which warn the driver via men-machine interfaces, is the ability to better predict information about the behavior of other relevant road users.

The object is achieved in that the road maps utilized by the driver assistance systems of the vehicles are enriched by supplementary information pertaining to the location- and/or time-specific compliance with traffic rules. In accordance with fixedly defined rules, the layer may be active and thus supply better predictions of the behavior of certain road users, among which are not only the vehicle driver but bicyclists, pedestrians and others as well. This additional information improves the interpretation of the vehicle environment. The own driving behavior can be optimized in this manner, it becomes more comfortable and safer, and accidents are ultimately able to be prevented.

Moreover, the object is achieved by a driver assistance system for a vehicle that can access supplementary information about a location- and/or time-specific compliance with traffic rules.

Said supplementary information may advantageously be subdivided into country-specific factors as a function of location and time and combined in map layers.

The additional map layer may be enriched on the basis of accident statistics, for instance, and by the display of "unwritten rules". Moreover, dangerous situations may be classified from measured data and used for populating the map layer.

In one further development, the supplementary information is stored in a separate map layer, in addition to the road map, so that rapid access is possible. In addition, the supplementary data are easily modified without the need to modify the map data.

In a further refinement, country-specific factors as a function of location and time are grouped and combined in map layers. This allows rapid access to the desired supplementary information.

In a further refinement, the supplementary information is ascertained from information sources like accident statistics, the recording of "unwritten rules" of a country/region, and the learning from measured data, for example. This enables an uncomplicated and reliable determination of supplementary information.

In one further specific development, the supplementary information is taken into account in the form of a movement model; the movement model is developed to predict the behavior of a road user and is dependent upon a location and/or time of day. For example, the movement model may predict the behavior of a pedestrian or the behavior of a vehicle. In accordance with the movement model, the driver assistance system may output a different recommendation or implement a different control of the vehicle. For example, the driver assistance system could intervene in the engine control and/or the steering and/or the brake system.

One exemplary embodiment of the present invention is described in greater detail in the following description.

BRIEF DESCRIPTION OF THE DRAWING

The FIGURE schematically illustrates the structure and parameterization of a driver assistance system as a function of environmental information.

DETAILED DESCRIPTION

The FIGURE shows a random number of sensors 2 that can be found in a vehicle. Among such environmental sensors, for instance, are a navigation system including a stored road map, radar or laser sensors for detecting the distance to other vehicles, as well as a vehicle-to-vehicle communications device. Moreover, sensors 2 for acquiring state variables of the vehicle are provided, such as the speed, the rates of rotation of the vehicle wheels, or the lateral vehicle acceleration.

The information from the individual sensors is supplied in the form of input signals to a control or regulation unit 4, which in turn is equipped with an evaluation block 6, a memory block 8, and a selection block 10. The current data acquired by sensors 2 are first subjected to an analysis in evaluation block 6 to ascertain how critical the current driving or traffic situation is to be classified. Based on certain discrete assumptions, a classification into non-critical, normal and critical driving situations may be made. A critical driving situation is ascribed a high danger potential, while a non-critical driving situation is ascribed a low danger potential. Different sets of parameters that correspond to the individual danger situations are stored in memory block 8.

In selection block 10 of control unit 4, the appropriate set of parameters is selected from evaluation block 6 from memory block 8 and activated as a function of the current evaluation of the driving situation. The selected set of parameters is then supplied to one or multiple driver assistance system(s) 12, so that the particular driver assistance system is set to a normal, high or low danger potential.

In addition, a navigation system which includes a stored road map is viewed. Navigation systems of this type also output current location- and/or time-specific information on their display, e.g., regarding speed limits. This information is either already stored in the road map or the navigation system, or it is imported via the traffic radio, for example.

The compliance or non-compliance with traffic rules also may give rise to different danger potentials. Such traffic rules are country-specific and compliance with these rules depends on time and location factors. Counted among the location-dependent (risk) factors are, for example, the environment of schools and kindergartens, where the probability is higher that traffic rules will not be obeyed along the access routes, for instance by children on their way to school. While compliance with many traffic rules is to be expected in many cultures and exceptions such as ghost drivers on a superhighway occur only infrequently, the danger of non-compliance with particular traffic rules, for example driving in the wrong direction on one-way roads, is very high in certain countries.

Other rules, such as maintaining a minimum distance from the driver in front, are frequently violated, for instance in Germany, and can therefore be stored appropriately in the automated driving functionality of the driver assistance system.

The probability that traffic rules are violated in the immediate vicinity of schools and kindergartens and along the access routes, e.g., shortly prior to the start of classes and following the end of classes, is increased, for instance as far as the proper use of pedestrian crossings ("zebra crossing") is concerned.

The previously described location- and/or time-dependent factors can be grouped accordingly and combined in map layers. Active layers are used in interpreting the environment and either displayed to the driver on the display of the navigation system, or the behavior of the vehicle is adapted accordingly. The individual layers may be enriched on the basis of the most varied information sources. For example, accident statistics provide information as to where and how often traffic rules have not been obeyed. This makes it possible to better estimate the probability of an accident occurrence. In addition, "unwritten rules" of a country or region can be displayed, and dangerous situations be classified from measured data and taken into account.

The driver assistance system may consider the supplementary information in assisting the driver in driving the vehicle, in autonomous driving of the vehicle, and in safety functionalities, such as automatic braking. For example, the driver assistance system may output information as a function of the driving situation or the supplementary information. In addition, the driver assistance system can actively intervene in the control and regulation of the vehicle as a function of the driving situation of the vehicle and as a function of the supplementary information.

For instance, one possibility for more optimal use of the supplementary information is to employ other movement models as a function of location and/or time.

Movement models are utilized for predicting the direction in which another road user is moving. The prediction forms a basis for planning the own behavior. Movement models may be used for vehicles, but for pedestrians as well.

"Normal" pedestrians typically move along sidewalks. After school lets out or shortly before it starts, students tend to cross the road rather spontaneously (without paying proper attention). Their movement then contradicts the simple movement model for a normal pedestrian. As a result, a movement model for a student is used in the vicinity of schools between the hours of 7:45-8:15 am or between 1:00-2:00 pm. The driver assistance system thus receives the information from the modified movement model that more passive and slower passing of the school region is necessary between 7:45-8:15 am or between 1:00-2:00 pm than outside the indicated times.

In an analogous manner, different movement models for pedestrians and/or vehicles may be used for different countries. In some countries, the pedestrians are more likely to disregard a red traffic light than in other countries. In addition, vehicles or motorcycles overtake more aggressively in some countries than in others. The appropriate supplementary information in connection with the countries and/or locations and/or times of day is therefore stored accordingly.

What is claimed is:

1. A driver assistance system for a vehicle that is driving in a particular location at a particular time, comprising:
   a data storage device in which is stored a road map and supplementary information, wherein the supplementary information characterizes, for each of a plurality of combinations of locations and times of day, how at least one of pedestrians and other vehicles usually comply with traffic rules at the respective location at the respective time of day; and
   a processing device that is in communication with the data storage device, wherein the processing device is configured to:
      based on the stored road map and based on an identification of the particular time, obtain from the data storage device the supplementary information's characterization of usual compliance of the at least one of pedestrians and other vehicles with the traffic rules at the particular location in which the vehicle is driving at the particular time; and
      in order to assist a driver in operating the vehicle, select, based on the obtained characterization, a driving maneuver for implementation by the vehicle in the particular location at the particular time.

2. The driver assistance system as recited in claim 1, wherein the supplementary information is stored in a separate map layer, in addition to the road map.

3. The driver assistance system as recited in claim 1, wherein country-specific location- and time-dependent factors are grouped and combined in map layers.

4. The driver assistance system as recited in claim 1, the supplementary information being considered in the form of a movement model, the movement model being designed to predict the behavior of a road user, and the movement model being a function of at least one of a location and a time of day.

5. The driver assistance system as recited in claim 1, wherein the processing device is configured to output information to one of assist the driver and influence the steering of the vehicle based on the selected driving maneuver.

6. A method for assisting a driver in operating a vehicle that is driving in a particular location at a particular time, wherein a road map is stored and wherein information is stored that characterizes, for each of a plurality of combinations of locations and times of day, how at least one of pedestrians and other vehicles usually comply with traffic rules at the respective location at the respective time of day, the method comprising:
   based on the stored road map and based on an identification of the particular time, obtaining from the stored information, the information's characterization of usual compliance of the at least one of pedestrians and other vehicles with the traffic rules at the particular location in which the vehicle is driving at the particular time;
   selecting, based on the obtained characterization, a driving maneuver for implementation by the vehicle in the particular location at the particular time; and at least one of outputting information to the driver and influencing a control of the vehicle as a function of the selected driving maneuver.

7. The method as recited in claim 6, wherein the information is ascertained from information sources that includes at least one of accident statistics, acquisition of "unwritten rules" of a country/region, and learning from measured data.

8. A non-transitory computer-readable medium on which are stored instructions that are executable by a processor and that, when executed by the processor cause the processor to perform a method for assisting a driver in operating a vehicle that is driving in a particular location at a particular time, wherein a road map is stored and wherein information is stored that characterizes, for each of a plurality of combinations of locations and times of day, how at least one of pedestrians and other vehicles usually comply with traffic rules at the respective location at the respective time of day, the method comprising:
- based on the stored road map and based on an identification of the particular time, obtaining from the stored information, the information's characterization of usual compliance of the at least one of pedestrians and other vehicles with the traffic rules at the particular location in which the vehicle is driving at the particular time;
- selecting, based on the obtained characterization, a driving maneuver for implementation by the vehicle in the particular location at the particular time; and
- at least one of outputting information to the driver and influencing a control of the vehicle as a function of the selected driving maneuver.

\* \* \* \* \*